(12) United States Patent
Qi et al.

(10) Patent No.: US 10,310,506 B1
(45) Date of Patent: Jun. 4, 2019

(54) SMART SELF-DRIVING SYSTEMS WITH SIDE FOLLOW AND OBSTACLE AVOIDANCE

(71) Applicant: LINGDONG TECHNOLOGY (BEIJING) CO. LTD, Beijing (CN)

(72) Inventors: Ou Qi, Beijing (CN); Xingyu Lian, Beijing (CN); Zhaoqiang Chen, Beijing (CN)

(73) Assignee: LINGDONG TECHNOLOGY (BEIJING) CO. LTD, Beijing (CN)

(*) Notice: Subject to any disclaimer, the term of this patent is extended or adjusted under 35 U.S.C. 154(b) by 0 days.

(21) Appl. No.: 16/046,206

(22) Filed: Jul. 26, 2018

Related U.S. Application Data

(63) Continuation of application No. PCT/CN2018/096544, filed on Jul. 20, 2018.

(51) Int. Cl.
| | | |
|---|---|---|
| *G05D 1/00* | (2006.01) | |
| *A45C 15/00* | (2006.01) | |
| *A45C 5/14* | (2006.01) | |
| *A45C 5/03* | (2006.01) | |
| *G05D 1/02* | (2006.01) | |
| *A45C 13/26* | (2006.01) | |

(52) U.S. Cl.
CPC ............ *G05D 1/0088* (2013.01); *A45C 5/03* (2013.01); *A45C 5/14* (2013.01); *A45C 13/262* (2013.01); *A45C 15/00* (2013.01); *G05D 1/0246* (2013.01); *A45C 2013/267* (2013.01); *G05D 1/0242* (2013.01); *G05D 1/0255* (2013.01); *G05D 1/0257* (2013.01)

(58) Field of Classification Search
CPC .. G05D 1/0088; G05D 1/0246; G05D 1/0255; G05D 1/0242; G05D 1/0257; A45C 15/00; A45C 5/14; A45C 5/03; A45C 13/262; A45C 2013/267
See application file for complete search history.

(56) References Cited

U.S. PATENT DOCUMENTS 5,316,096 A    5/1994  Good
9,215,561 B1 * 12/2015  Arman ................... H04W 4/90
(Continued)

FOREIGN PATENT DOCUMENTS

CN    103376803 A    10/2013
CN    105022396 A    11/2015
(Continued)

OTHER PUBLICATIONS

International Search Report and Written Opinion for International Application No. PCT/CN2018/096544 dated Oct. 24, 2018.
(Continued)

*Primary Examiner* — Frederick M Brushaber
(74) *Attorney, Agent, or Firm* — Patterson + Sheridan, LLP

(57) ABSTRACT

A smart self-driving system includes a body, such as a piece of luggage, supported by a plurality of wheel assemblies. One or more front proximity sensors are coupled to the body and configured to detect an object moving in a given direction while the body is in a rear follow position behind the object. One or more side proximity sensors are coupled to the body and configured to detect the object moving in the given direction while the body is in a side follow position on the side of the object.

30 Claims, 11 Drawing Sheets

(56) References Cited

U.S. PATENT DOCUMENTS

| | | | |
|---|---|---|---|
| 9,661,905 B2 | 5/2017 | O'Donnell et al. | |
| 9,870,683 B1* | 1/2018 | Pious | G08B 13/14 |
| 2014/0002239 A1* | 1/2014 | Rayner | G08B 13/1427 |
| | | | 340/5.61 |
| 2014/0107868 A1 | 4/2014 | DiGiacomcantonio et al. | |
| 2014/0277841 A1 | 9/2014 | Klicpera et al. | |
| 2015/0025708 A1 | 1/2015 | Anderson | |
| 2015/0327638 A1* | 11/2015 | Ghosh | A45C 5/14 |
| | | | 180/167 |
| 2017/0049202 A1* | 2/2017 | Nascimento | A45C 13/262 |
| 2017/0086549 A1 | 3/2017 | Caputo et al. | |
| 2017/0220040 A1* | 8/2017 | London | G05D 1/0278 |

FOREIGN PATENT DOCUMENTS

| | | |
|---|---|---|
| CN | 105717927 A | 6/2016 |
| CN | 207370256 U | 5/2018 |
| JP | 2002255037 A | 9/2002 |

OTHER PUBLICATIONS

COWA ROBOT. "COWAROBOT R1: The First Robotic Suitcase." YouTube, Jul. 20, 2016, https://www.youtube.com/watch?v=CI2KeIDN-fQ&t=3s.

TRAVELMATE. "This Futuristic Robot Suitcase Moves on Its Own and Follows You." YouTube, Oct. 6, 2016, https://www.youtube.com/watch?v=Ai5haQmC97o.

90Fun. "90Fun Puppy1, The World's 1st Self-balance & Auto-follow Suitcase." YouTube, Jan. 9, 2018, https://www.youtube.com/watch?v=7KX5cYfNsnc.

* cited by examiner

SMART SELF-DRIVING SYSTEMS WITH SIDE FOLLOW AND OBSTACLE AVOIDANCE

BACKGROUND

Field

Embodiments disclosed herein relate to smart self-driving systems with side follow and obstacle avoidance.

Description of the Related Art

Travelers are often required to transport luggage across long distances, such as within long corridors of airport terminals. Transporting luggage may be inconvenient, stressful, and require undesirable levels of physical exertion. Even luggage that can be rolled on wheels has to be pulled or pushed, which can strain the arms and back of a person transporting the luggage. Some developers have incorporated electronics and motors into their products to provide self-driving luggage. However, current self-driving luggage designs follow from behind and out of the sight of the user, and are limited in their maneuverability to avoid obstacles, especially when being used in crowded places like airports, hotels, or a busy sidewalk.

Therefore, there exists a need for new and improved smart self-driving systems.

SUMMARY

A smart self-driving system comprising a body; and one or more proximity sensors coupled to the body and configured detect an object moving in a given direction while the body is in a side follow position next to the object.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include a smart luggage system that is self-driving and has one or more motorized wheel assemblies. The smart luggage system is configured to autonomously follow any type of object, such as a user moving in a given direction. Although the embodiments of the smart luggage system are described and illustrated herein with respect to a suitcase, the embodiments may be used with other types of portable equipment, such as a shopping cart.

In one embodiment, the smart luggage system is configured to follow along the side of a user in a given direction. In one embodiment, the smart luggage system is configured to follow along the side of a user within a predetermine area as detected by the system. In one embodiment, the smart luggage system is configured to follow along the side of a user, transition to a follow position behind the user to avoid an obstacle, and then transition back to the side follow position next to the user. In one embodiment, the smart luggage system can move in a forward direction that is different from a head direction of the luggage.

Figure 1:
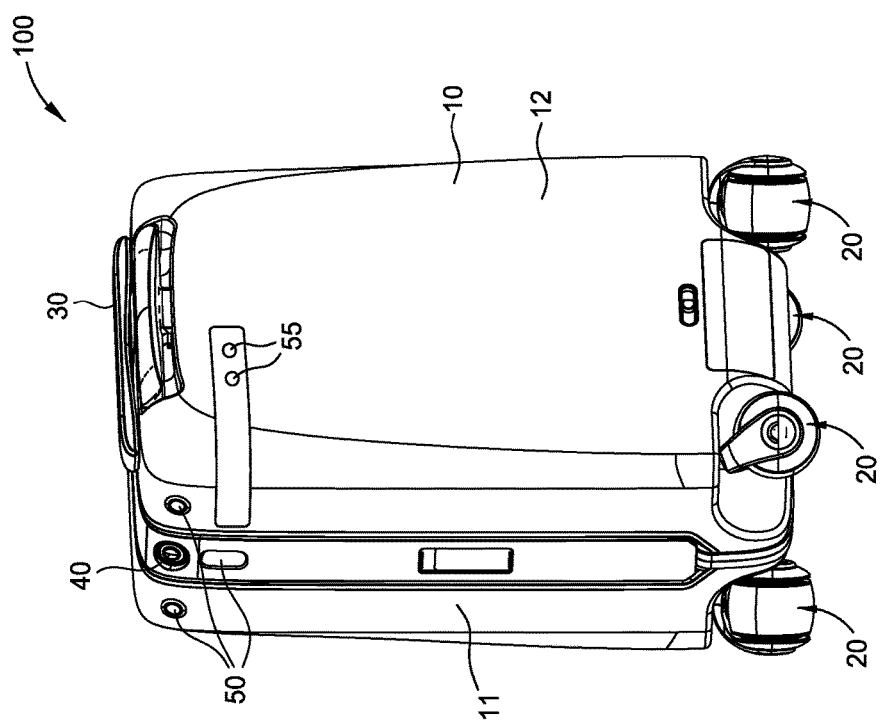
FIG. 1 is a perspective view of a smart luggage system according to one embodiment.

FIG. 1 is a perspective view of a smart luggage system 100 according to one embodiment. The smart luggage system 100 includes a body in the form of a piece of luggage 10, such as a suitcase, that can be used to store items for transport. The luggage 10 is supported by four wheel assemblies 20. Each wheel assembly 20 is configured to rotate in a given direction and roll in the given direction. According to one example, the wheel assemblies 20 may be caster-type wheels. All four of the wheel assemblies 20 may be motorized to move the luggage in a given direction. A handle 30 is provided to allow a user to push, pull, and/or lift the luggage 10.

The system 100 includes one or more cameras 40 coupled to the luggage 10. One camera 40 is shown located on a front side 11 of the luggage 10 near the top end of the luggage 10 although any number of cameras 40 may be used. The camera 40 is configured to record visual images and/or detect the presence of nearby objects (similar to proximity sensors 50) and may include a monocular camera, a binocular camera, and/or a stereo camera.

The system 100 includes one or more front proximity sensors 50 coupled to the front side 11 of the luggage 10. Three front proximity sensors 50 are shown located on the front side of the luggage 10 near the top end of the luggage 10. Any number of front proximity sensors 50 may be used and located at different positions on the front side 11 of the luggage 10.

The system 100 includes one or more side proximity sensors 55 coupled to a right side 12 of the luggage 10. Two side proximity sensors 55 are shown located on the right side 12 of the luggage 10 near the top end of the luggage 10. Although the proximity sensors 55 are shown on the right side of the luggage 10, the proximity sensors 55 can be located on the left side, or on both the right and left sides, of the luggage 10. Any number of side proximity sensors 55 may be used and located at different positions on the either side of the luggage 10.

The front and side proximity sensors 50, 55 are configured to detect the presence of nearby objects that are stationary or moving. For example, the front proximity sensors 50 are configured to detect a user moving in a given direction while the luggage 10 is in a rear follow position behind the user. For example, the side proximity sensors 55 are configured to detect a user moving in a given direction while the luggage 10 is in a side follow position on the side of the user.

The front and side proximity sensors 50, 55 may include cameras, sonar sensors, infrared sensors, radar sensors, and/or LiDAR sensors. The combination of the information recorded, detected, and/or measured by the camera 40, the front proximity sensors 50, and/or the side proximity sensors 55 is used to help autonomously maintain the luggage 10 in a rear follow position and a side follow position next to a user. The combination of the information recorded, detected, and/or measured by the camera 40, the front proximity sensors 50, and the side proximity sensors 55 is also used to help autonomously move the luggage 10 in a given direction with the user while avoiding nearby obstacles.

In one embodiment, a single proximity sensor can be used to detect the presence of objects near both the front and sides of the luggage 10. For example, the single proximity sensor can be a camera having a 360 degree viewing range or a LiDAR sensor. The single proximity sensor can be used to autonomously move the luggage 10 in both the side and rear follow positions as further described below.

Figure 2:
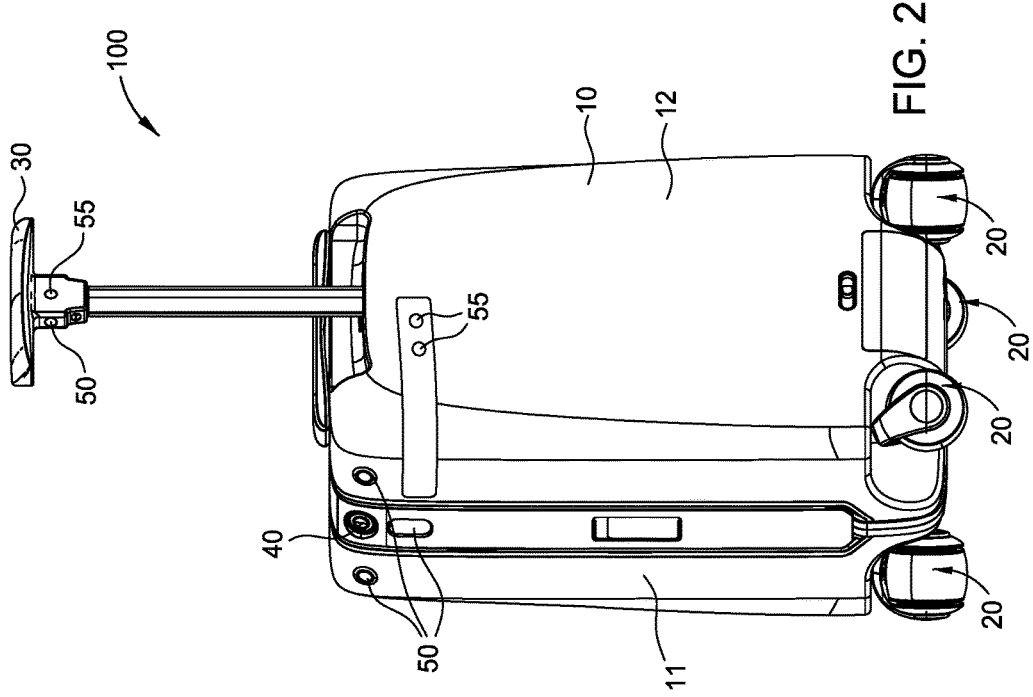
FIG. 2 is a perspective view of a smart luggage system according to another embodiment.

FIG. 2 is a perspective view of a smart luggage system 100 according to another embodiment. As shown, a front proximity sensor 50 and a side proximity sensor are positioned on the front and right sides of the handle 30, respectively. The embodiments of the system 100 include any combination or number of front proximity sensors 50 positioned on the front side 11 of the luggage 10 and/or the handle 30, as well as any combination or number of side proximity sensors 55 positioned on the right and/or left sides of the luggage 10 and/or the handle 30.

Figure 3:
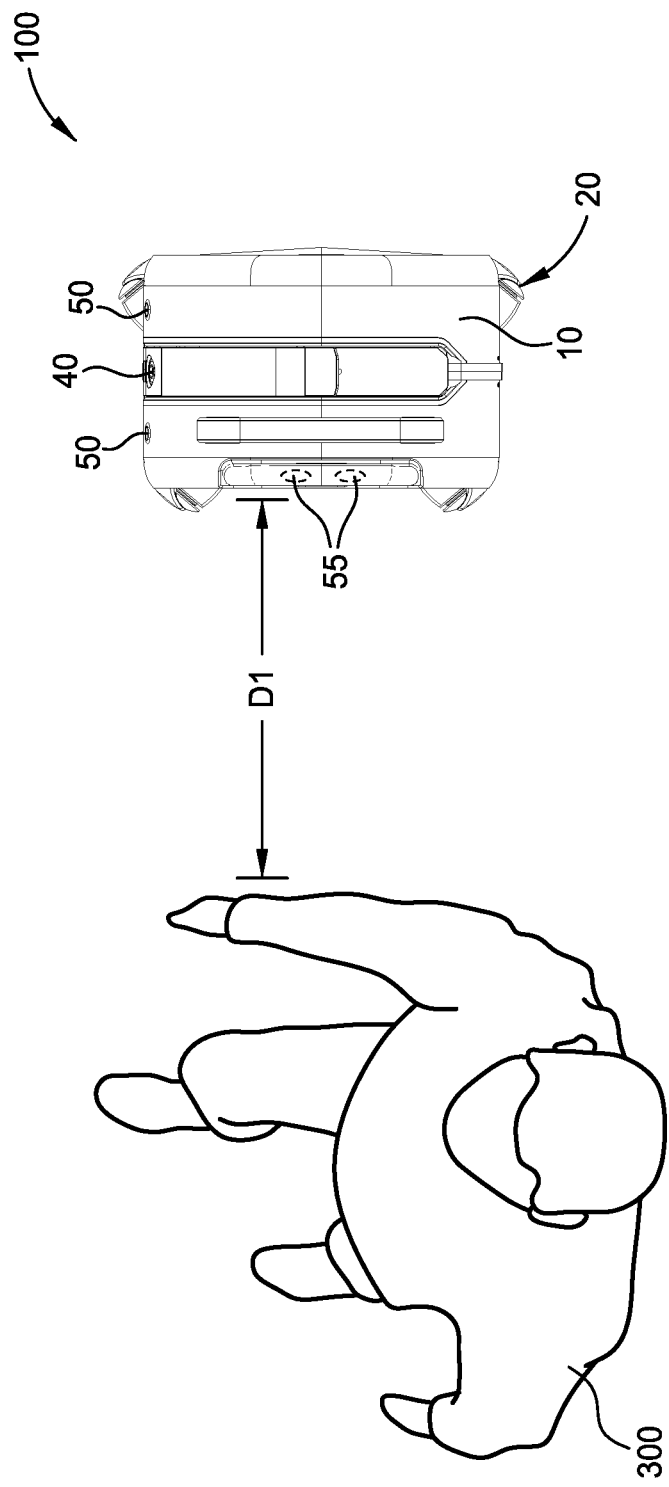
FIG. 3 is a plan view of the smart luggage system in a side follow position on the side of a user according to one embodiment.

FIG. 3 is a plan view of the smart luggage system 100 in a side follow position on the side of an object, shown as a user 300, according to one embodiment. The system 100 is configured to maintain the luggage 10 in the side follow position as the user 300 moves in a given direction. The system 100 is configured to maintain the luggage 10 within a side distance D1 of the user 300. The side distance D1 can be adjusted (e.g. increased or decreased) and set as desired by the user 300 before, during, and/or after operation of the system 100. The side distance D1 can be adjusted and set by a mobile phone, a wristband, and/or a gesture of the user 300 as identified by the camera 40. The side follow position can be on the right side or the left side of the user 300.

Figure 4:
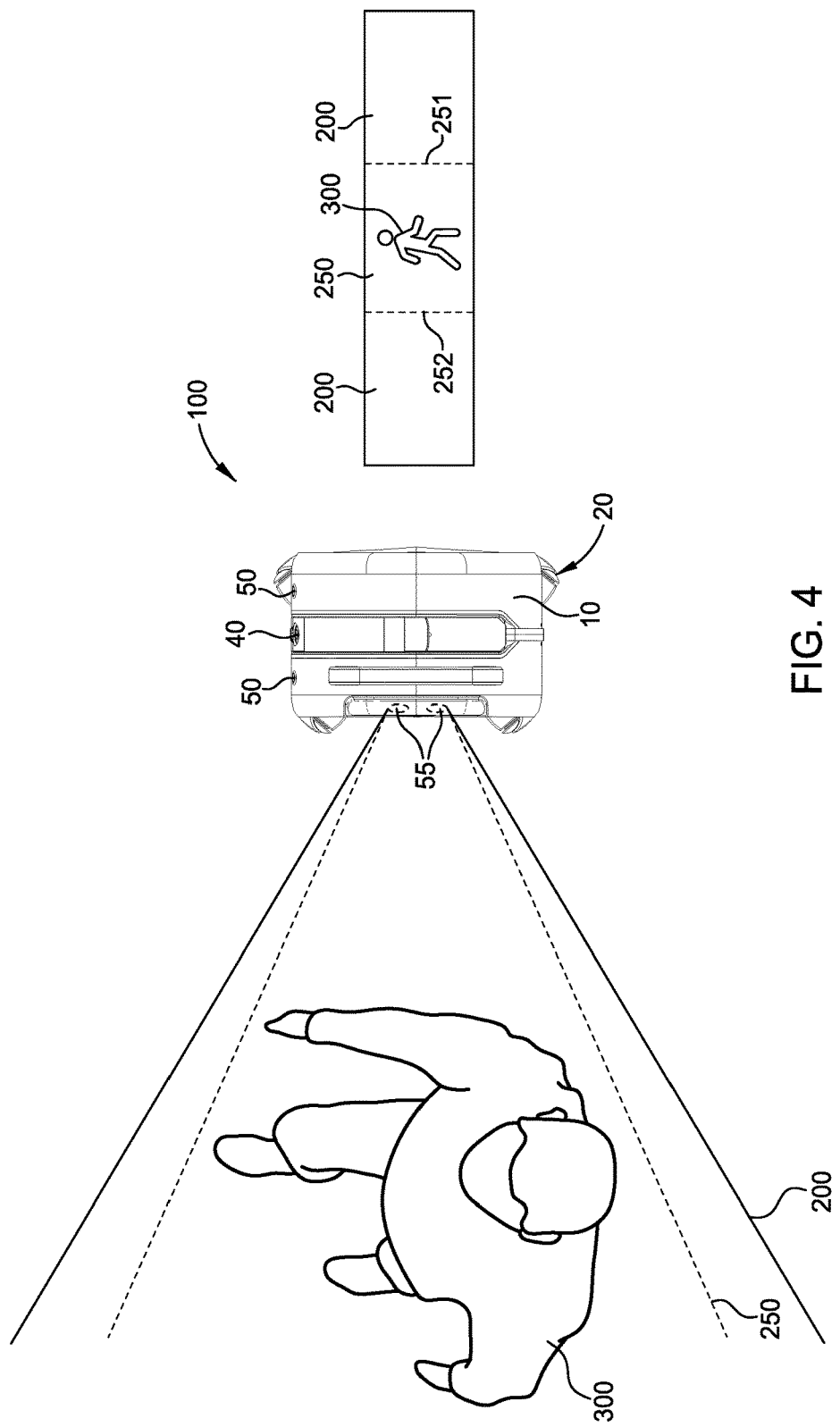
FIG. 4 is a plan view of the smart luggage system in the side follow position and showing the user within a predetermined area as detected by the smart luggage system according to one embodiment.

FIG. 4 is a plan view of the smart luggage system 100 in the side follow position, and showing the user 300 within a predetermined area 250 as detected by the side proximity sensors 55 according to one embodiment. The predetermined area 250 includes a front boundary 251 and a rear boundary 252. The predetermined area 250 is located within a region 200 that can be detected by the side proximity sensors 55. The system 100 is configured to maintain the luggage 10 in the side follow position and with the user 300 located within the predetermined area 250 as the user 300 moves in a given direction. The predetermined area 250 and/or the region 200 can be adjusted (e.g. increased or decreased) as desired by the user 300 before, during, and/or after operation of the system 100.

Figure 5:
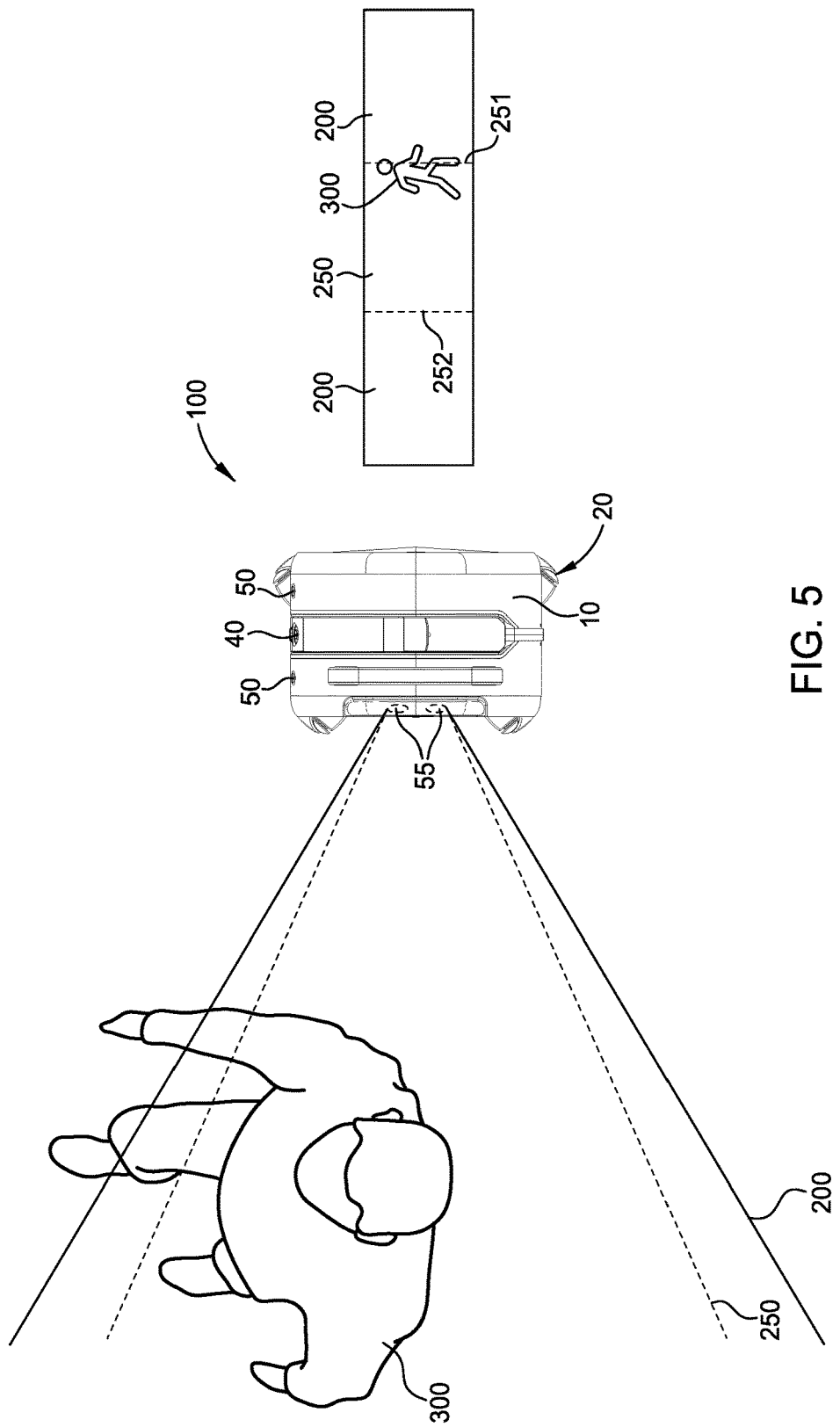
FIG. 5 is a plan view of the smart luggage system in the side follow position and showing the user near the front boundary of the predetermined area as detected by the smart luggage system according to one embodiment.

FIG. 5 is a plan view of the smart luggage system 100 in the side follow position, and showing the user 300 near or at least partially outside of the front boundary 251 of the predetermined area 250 as detected by the side proximity sensors 55 according to one embodiment. When the system 100 detects that the user 300 is near or at least partially outside of the front boundary 251, the system 100 is configured to speed up the wheel assemblies 20 to move the luggage 10 faster and keep the user 300 within the predetermined area 250. Similarly, when the system 100 detects that the user 300 is near or at least partially outside of the rear boundary 252, the system 100 is configured to slow down the wheel assemblies 20 to move the luggage 10 slower and keep the user 300 within the predetermined area 250.

Figure 6A:
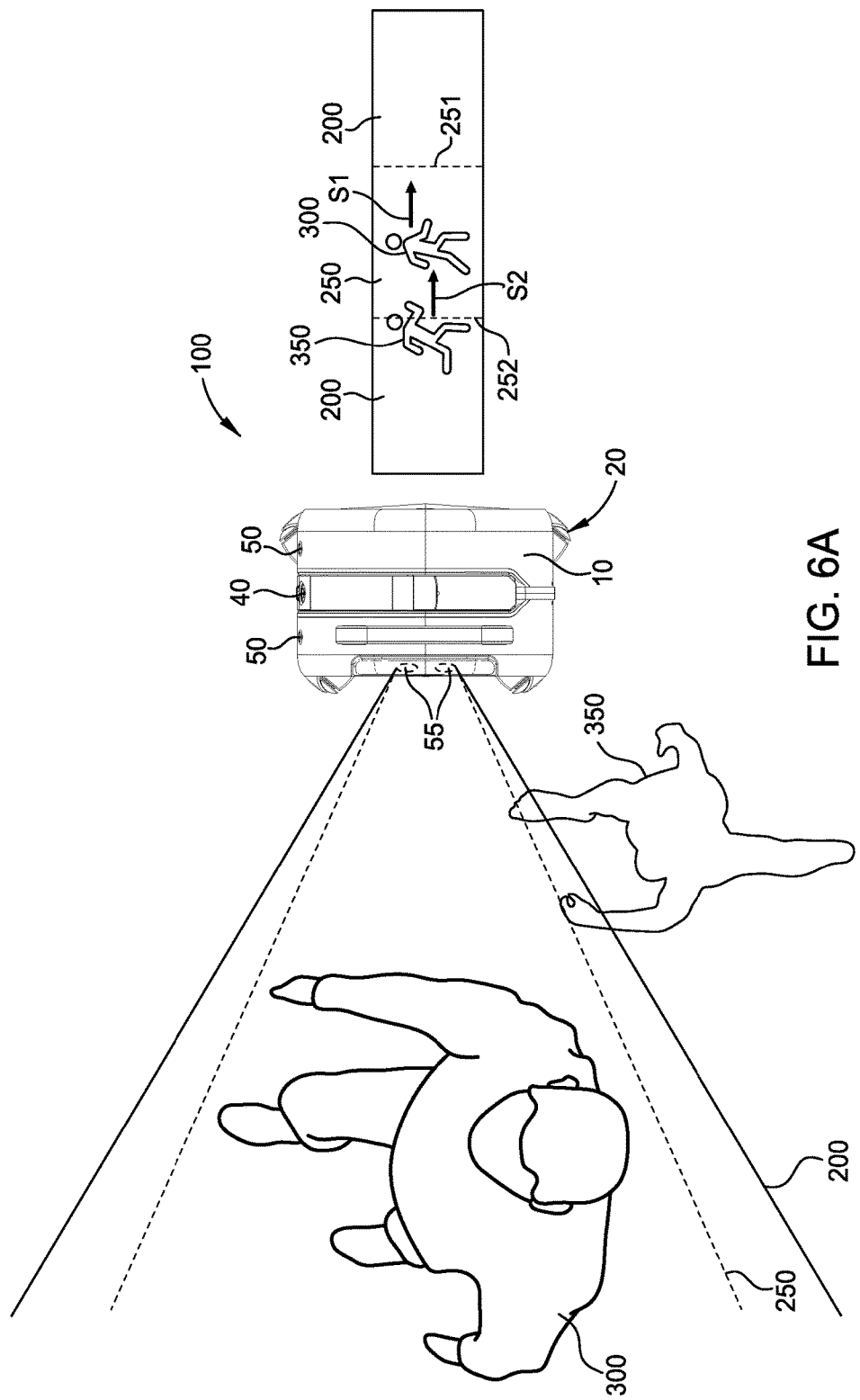
FIGS. 6A-6C illustrate a sequence of operation of the smart luggage system showing a third person moving between the user and the luggage according to one embodiment.
Figure 6B:
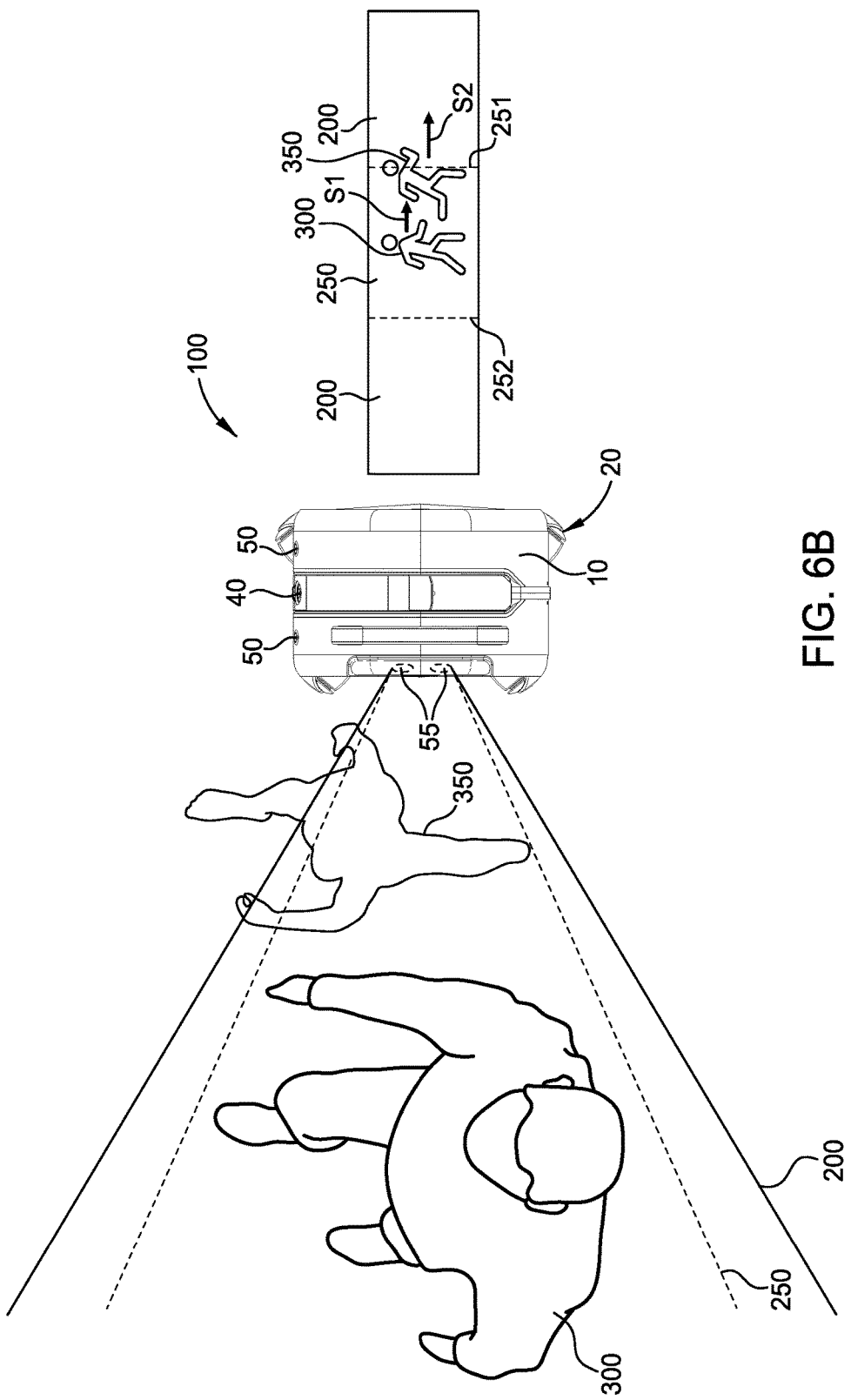
Figure 6C:
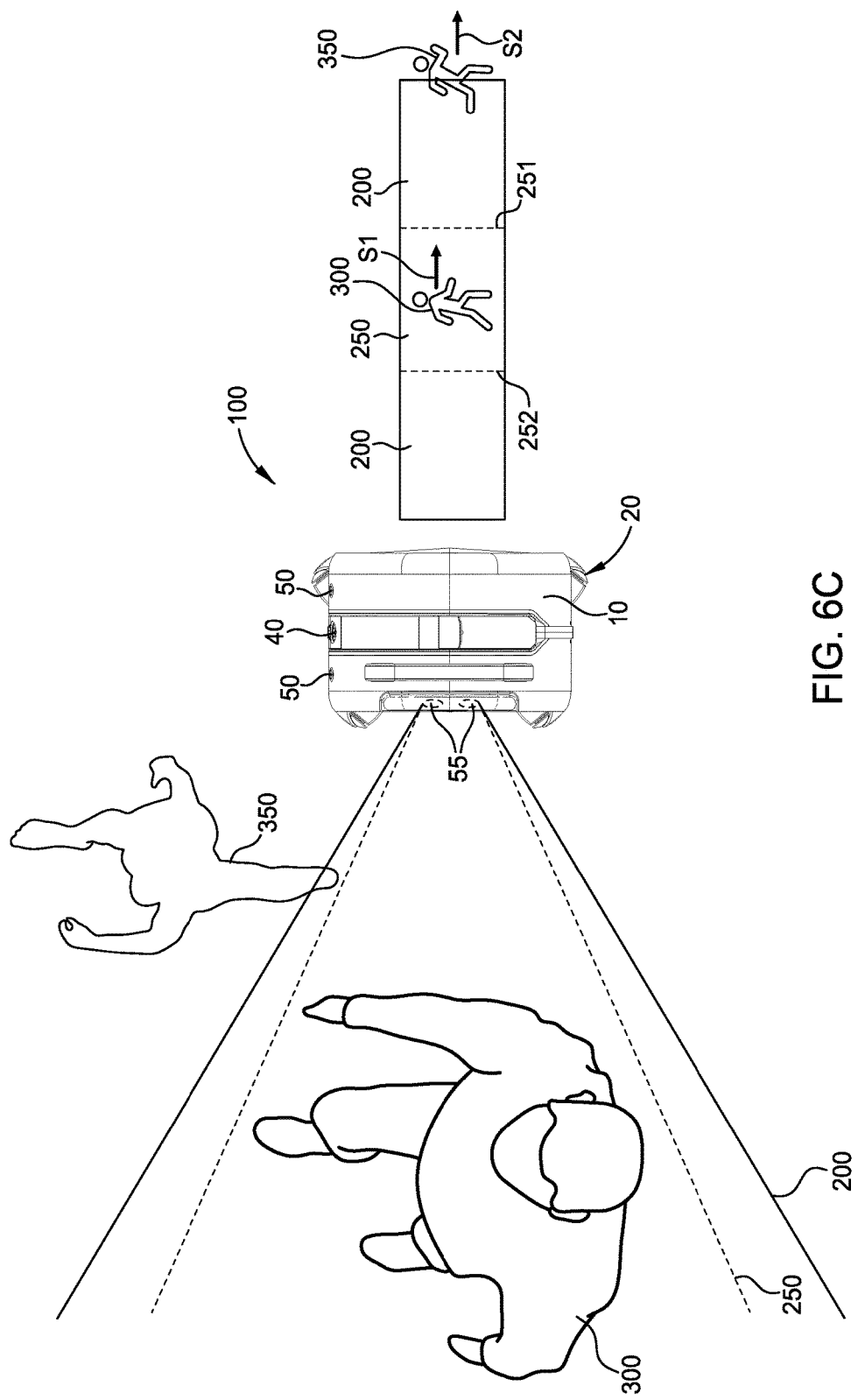

FIGS. 6A-6C illustrate a sequence of operation of the smart luggage system 100 showing another moving object in the form of a third person 350 moving in-between the user 300 and the luggage 10 according to one embodiment. The system 100 is configured to continuously monitor and measure the speed of the user 300 during operation. In the event that the third person 350 moves in-between the user 300 and the luggage 10, either from the front boundary 251 or the rear boundary 251, the system 100 is configured to remember the speed of the user 300 and keep moving at the stored speed instead of the speed of the third person 350.

FIG. 6A shows the user 300 moving at a speed S1 and is within the predetermined area 250. The system 100 will continuously monitor and measure the speed S1 of the user 300. The third person 350 is shown approaching the rear boundary 252 at a position between the user 300 and the luggage 10 and moving at a speed S2. The speed S2 is different than (e.g. greater than or less than) the speed S1.

FIG. 6B shows the third person 350 in-between the user 300 and the luggage 10. The system 100 is configured to detect the third person 350 and the speed S2 at which the third person 350 is moving. When the third person 350 at least partially or fully blocks the side proximity sensors 55 from detecting the user 300, the system 100 is configured to keep moving at the previously measured and stored speed S1 of the user 300.

FIG. 6C shows the third person 350 moving out of the region 200 such that the side proximity sensors 55 are able to detect the user 300 moving at the speed S1 again. The system 100 continues to move the luggage 10 in the given direction and maintains the luggage 10 in the side follow position.

Figure 7C:
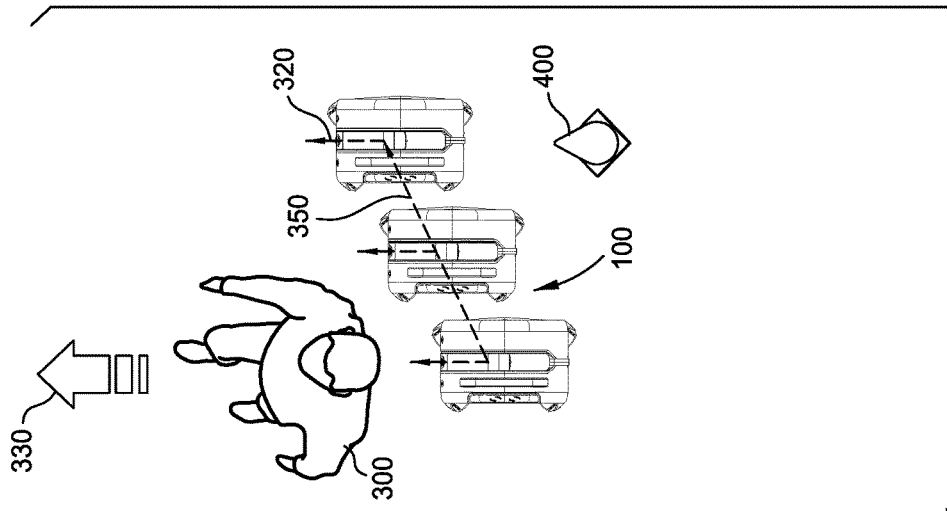
FIGS. 7A-7C illustrates a travel path of the smart luggage system when following a user in a given direction and avoiding an obstacle located in front of the luggage according to one embodiment.
Figure 7B:
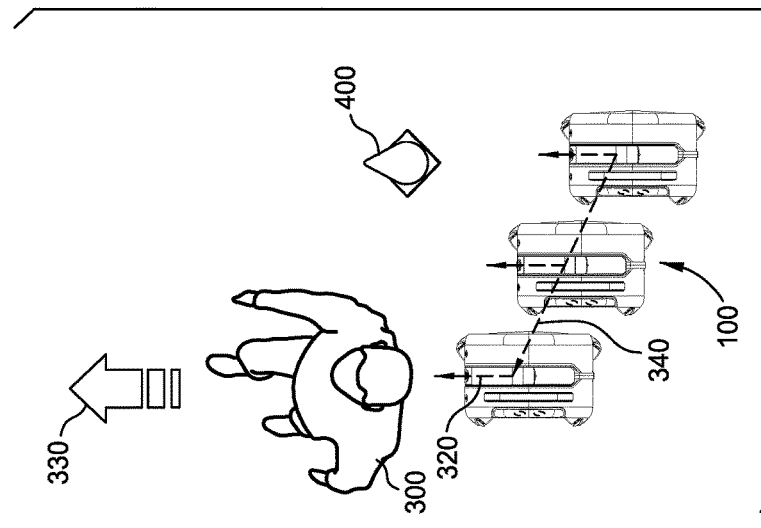
Figure 7A:
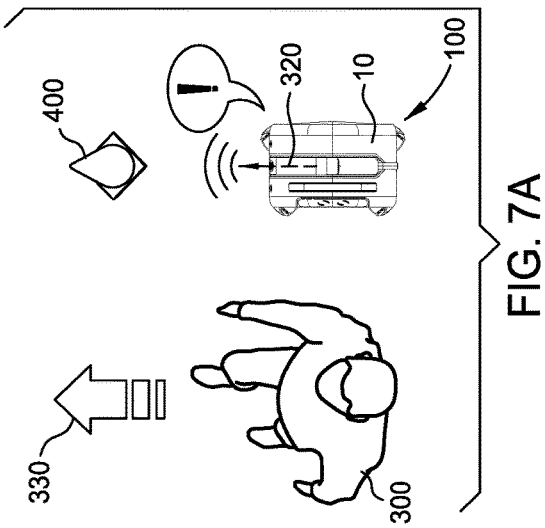

FIGS. 7A-7C illustrates a travel path of the smart luggage system 100 when following the user 300 in a given direction 330 and avoiding an obstacle 400 located in front of the luggage 10 according to one embodiment.

FIG. 7A shows the luggage 10 following the user 300 in a given direction 330 and in the side follow position. The front of the luggage 10 is facing a head direction 320 that is parallel to the given direction 330. The camera 40 and/or the front proximity sensors 50 detect the obstacle 400 in front of the luggage 10. The system 100 is configured to move the luggage 10 from the side follow position to a rear follow position.

FIG. 7B shows the luggage 10 transitioning to a rear follow position behind the user 300. The wheel assemblies 20 allow the luggage 10 to move in a diagonal forward direction 340 while keeping the front side of the luggage 10 facing in a straight head direction 320. The straight head direction 320 is different than the diagonal forward direction 340. After a predetermined amount of time, a predetermined amount of distance, or when instructed by the user 300, the system 100 is configured to move the luggage 10 from the rear follow position to the side follow position.

FIG. 7C shows the luggage 10 transitioning to the side follow position on the side of the user 300. The wheel assemblies 20 allow the luggage 10 to move in another diagonal forward direction 350 while keeping the front side of the luggage 10 facing in the straight head direction 320. The straight head direction 320 is different than the diagonal forward direction 350. Once in the side follow position, the system 100 will continue to keep the luggage 10 moving along with the user 300 in the given direction 330 as described above.

FIGS. 7A-7C illustrate only one sequence of operation. The smart luggage system 100 is capable of maneuvering across any number of travel paths and avoiding any number of obstacles. The smart luggage system 100 is also capable of transitioning between a right side follow position and a rear follow position. The smart luggage system 100 is also capable of transitioning between a left side follow position and a rear follow position. The smart luggage system 100 is also capable of transitioning from a right side follow position, to a rear follow position, and then to a left side follow position. In this embodiment, the luggage 10 may include side proximity sensors 55 on both sides of the luggage 10.

Figure 8:
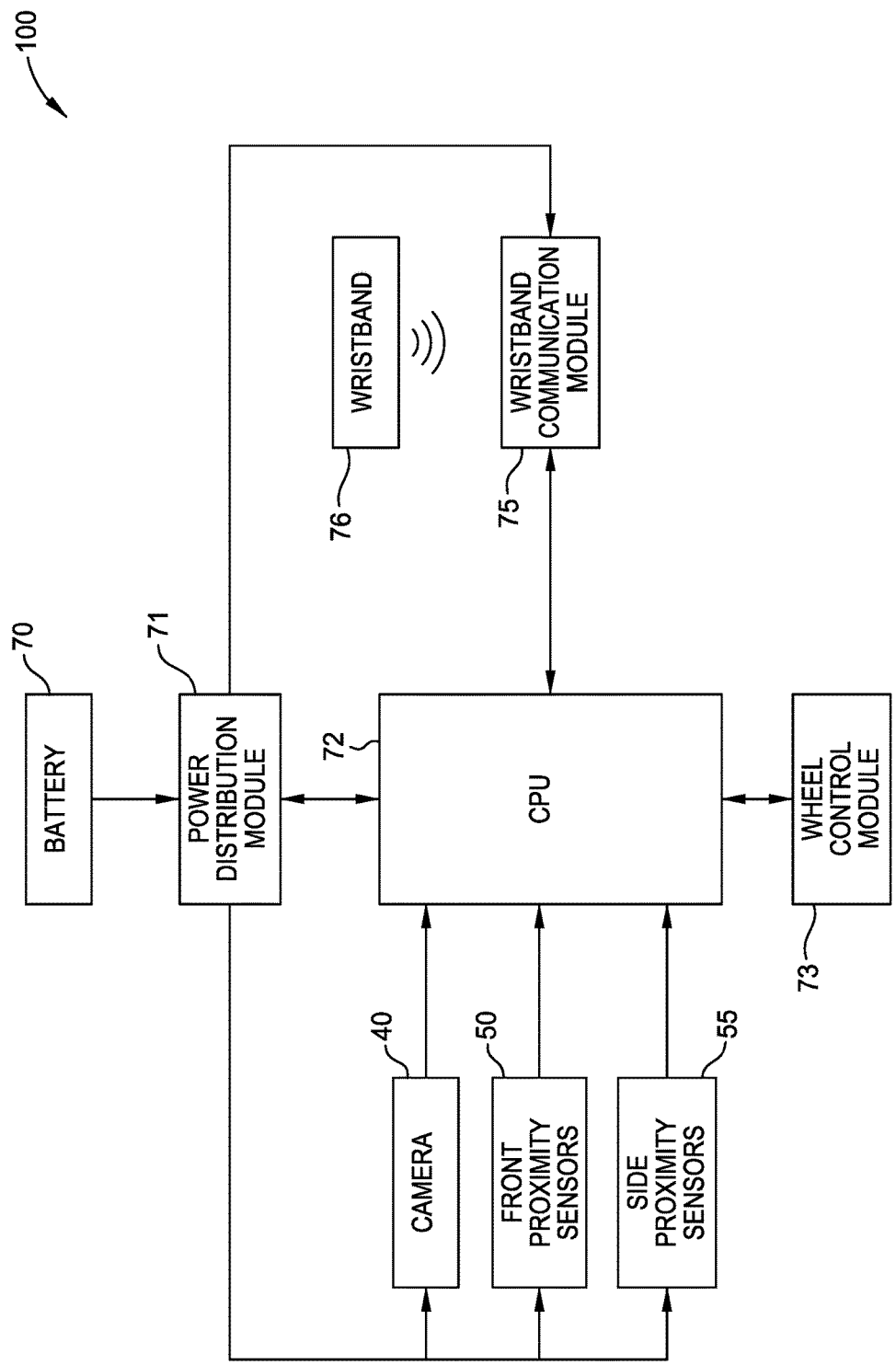
FIG. 8 is a block diagram of the smart luggage system according to one embodiment.

FIG. 8 is a block diagram of the smart luggage system according to one embodiment. The system 100 includes a battery 70 in communication with a power distribution module 71. The power distribution module 71 is configured to distribute power supplied by the battery 70 to the other components of the system 100.

The system 100 includes a central processing unit ("CPU") 72 in communication with a wristband communication module 75. A wristband 76 is used to communicate with the wristband communication module 75 via ultra-wideband, radio frequency identification (active and/or passive), Bluetooth (low energy), WiFi, and/or any other form of communication known in the art. The wristband 76 is configured to allow a user to send instructions to the CPU 72. The wristband 76 is also configured to allow a user to receive information from the CPU 72 regarding the operation of the system 100. In one embodiment, a remote control (such as the wristband 76) may be used to instruct the CPU 72 to move the luggage 10 in a given direction. A user can use the remote control to navigate the luggage 10 in a given direction.

The CPU 72 is also in communication with the camera 40, the front proximity sensors 50, and the side proximity sensors 55. The camera 40 is configured to communicate information regarding the visual images and presence of nearby objects that the camera 40 records and/or detects to the CPU 72. The front and side proximity sensors 50, 55 are configured to communicate information regarding the presence of objects near the luggage 10 to the CPU 72.

The CPU 72 is also in communication with a wheel control module 73. The wheel control module 73 is configured to control the rotary speed and/or orientation of each wheel assembly 20. The wheel control module 73 is also configured to communicate information regarding the wheel assemblies 20, such as the rotary speed and/or the orientation of the wheel, to the CPU 72. Although only one wheel control module 73 is shown, each wheel assembly 20 can include a separate wheel control module 73 in communication with the CPU 72. In one embodiment, the wheel control module 73 can be integrated into the CPU 72 as a single processing unit. According to one example, the CPU 72 includes a single wheel control module 73 to control all four wheel assemblies 20. According to one example, the CPU 72 includes four wheel control modules 73, one for each wheel assembly 20.

The CPU 72 is configured to analyze the information received from the various components (e.g. camera 40, proximity sensors 50, 55, wristband communication module 75, and/or wheel control module 73) of the system 100 and perform the computational functions programmed into the CPU 72 based on the information to operate the system 100 as described herein. For example, the CPU 72 is configured to determine a given direction and speed based on the information. The CPU 72 is configured to control the direction and speed of the luggage 10 relative to a user and/or the surrounding environment. For example, the CPU 72 is configured to control the direction and the speed of the luggage 10 through the wheel control module 73 by instructing the wheel control module 73 to adjust (e.g. increase, decrease, change, etc.) the orientation and/or speed of each wheel assembly 20.

In one embodiment, the CPU 72 is configured to instruct the wheel control module 73 and the wheel assemblies 20 to maintain the luggage 10 within the side distance D1 (as shown in FIG. 3) based on the information received from at least one of the camera 40, the front proximity sensors 50, and/or the side proximity sensors 55.

In one embodiment, the CPU 72 is configured to instruct the wheel control module 73 and the wheel assemblies 20 to maintain the user 300 within the predetermined area 250 (as shown in FIG. 4) based on the information received from at least one of the camera 40, the front proximity sensors 50, and/or the side proximity sensors 55.

In one embodiment, the CPU 72 is configured to instruct the wheel control module 73 and the wheel assemblies 20 to keep the luggage 10 moving at the recorded speed of the user 300 when the third person 350 at least partially or fully blocks the side proximity sensors 55 from detecting the user 300 (as shown in FIGS. 6A-6C) based on the information received from at least one of the camera 40, the front proximity sensors 50, and/or the side proximity sensors 55.

In one embodiment, the CPU 72 is configured to instruct the wheel control module 73 and the wheel assemblies 20 to transition the luggage 10 from the side follow position to the rear follow position and back to the side follow position (as shown in FIGS. 7A-7C) based on the information received from at least one of the camera 40, the front proximity sensors 50, and/or the side proximity sensors 55.

In one embodiment, the CPU 72 is configured to instruct the wheel control module 73 and the wheel assemblies 20 to transition the luggage 10 from the rear follow position back to the side follow position (as shown in FIGS. 7A-7C) after a predetermined amount of time or when instructed by the user 300.

In one embodiment, the smart luggage system 100 is configured to autonomously side or rear follow any one or more users, such as a person, in a given direction. In one embodiment, the smart luggage system 100 is configured to autonomously side or rear follow any one or more objects in a given direction. In one embodiment, the smart luggage system 100 is configured to autonomously move in a given direction based on instructions received from a user via a remote control. In one embodiment, the smart luggage system 100 is configured to autonomously move in any given direction from one location to another location based on a set of pre-programmed instructions provided by the user.

Figure 9:
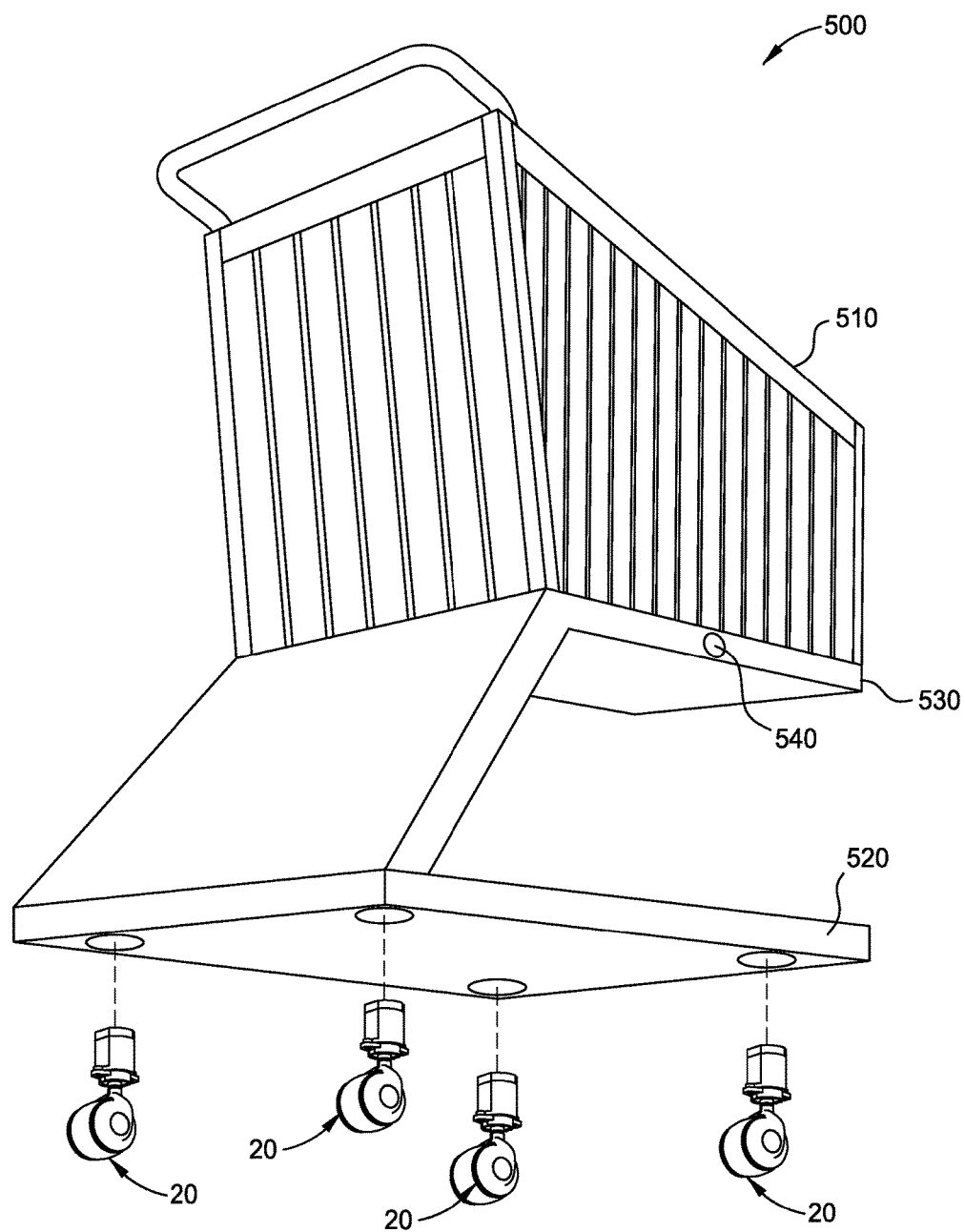
FIG. 9 is a perspective view of a smart shopping cart system according to one embodiment.

FIG. 9 is a perspective view of a smart shopping cart system 500 according to one embodiment. All of the embodiments described herein with respect to the smart luggage system 100 may be incorporated into the smart shopping cart system 500. For example, the system 500 includes the wheel assemblies 20 as described above with respect to the smart luggage system 100 to move the system in the side follow position.

The system 500 includes a body 510 coupled to a base 520. The body 510 may be a cart, basket, or any other type of container that can be used to contain and/or transport items. Any of the components of the system 500, such as the battery 70, the power distribution module 71, the CPU 72, the wristband communication module 75, and/or the wheel control module 73 may be disposed in the body 510 and/or the base 520. The wheel assemblies 20 are coupled to the base 520 and configured to move the system 500 in a given direction similar to the movement of the luggage 10 described above. The wheel assemblies 20 are configured to move the body 510 along a forward direction that is different than a head direction of the body 510.

The front side of the system 500 may include one or more cameras, proximity sensors, and/or any other type of sensing device as identified by reference number 530. The left side of the system 500 may also include one or more cameras, proximity sensors, and/or any other type of sensing device as identified by reference number 540. Any number of cameras, proximity sensors, and/or any other type of sensing device may be coupled to any side of the body 510 and/or base 520.

Figure 10:
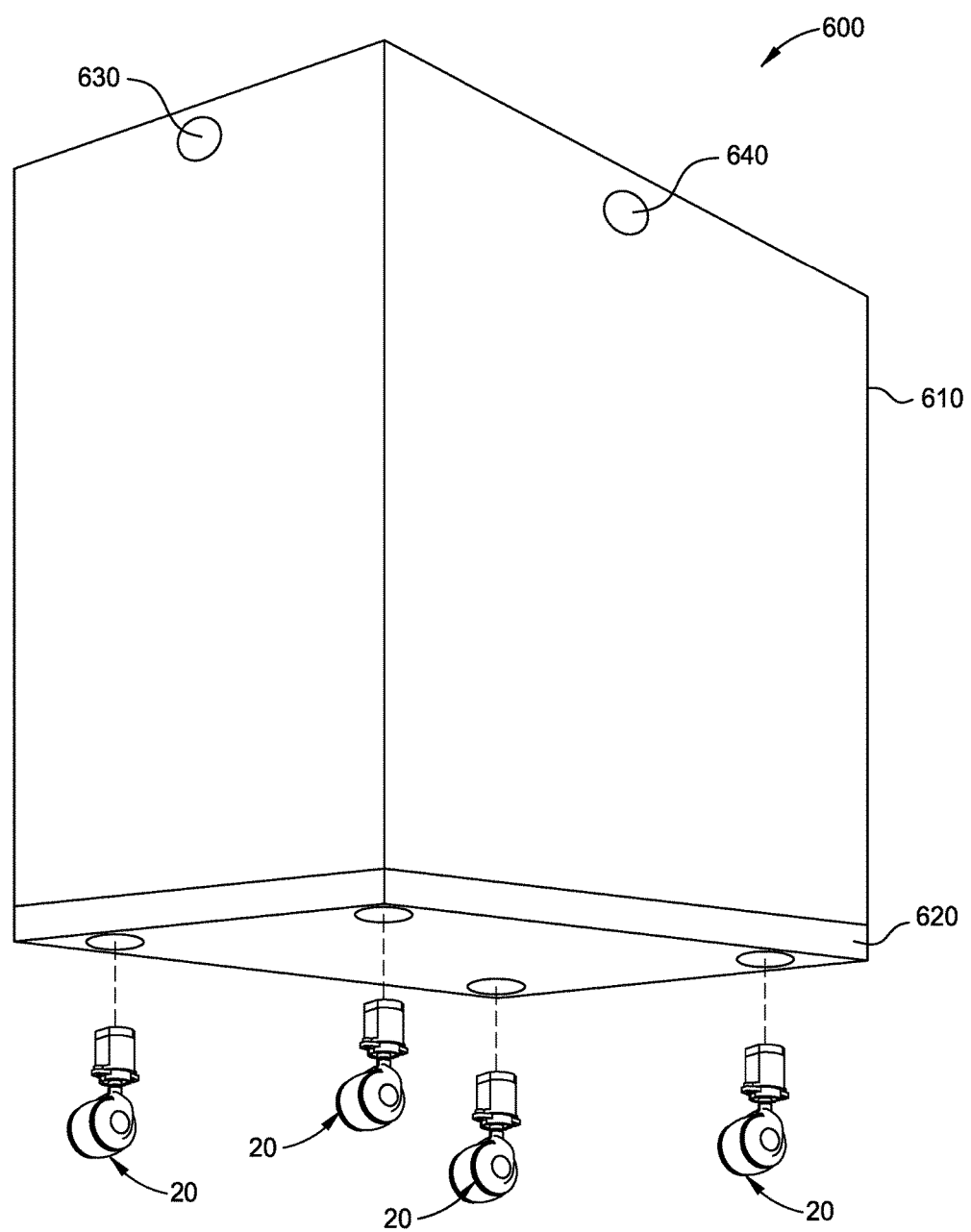
FIG. 10 is a perspective view of a smart self-driving system according to one embodiment.

FIG. 10 is a perspective view of a smart self-driving system 600 according to one embodiment. All of the embodiments described herein with respect to the smart luggage system 100 may be incorporated into the smart self-driving system 600. For example, the system 600 includes the wheel assemblies 20 as described above with respect to the smart luggage system 100 to move the system 600 in the side follow position.

The system 600 includes a body 610 coupled to a base 620. The body 610 and the base 620 may be separate components or may be formed as a single component. Any of the components of the system 600, such as the battery 70, the power distribution module 71, the CPU 72, the wristband communication module 75, and/or the wheel control module 73 may be disposed in the body 610 and/or the base 620. The wheel assemblies 20 are coupled to the base 620 and configured to move the system 600 in a given direction similar to the movement of the luggage 10 described above. The wheel assemblies 20 are configured to move the body 610 along a forward direction that is different than a head direction of the body 610.

The front side of the system 600 may include one or more cameras, proximity sensors, and/or any other type of sensing device as identified by reference number 630. The right side of the system 600 may also include one or more cameras, proximity sensors, and/or any other type of sensing device as identified by reference number 640. Any number of cameras, proximity sensors, and/or any other type of sensing device may be coupled to any side of the body 610 and/or base 620.

In one embodiment, the body 610 may be a container used to contain and/or transport items placed inside the body 610. In one embodiment, the body 610 may be a support member used to support and/or transport items placed on top of the body 610. In one embodiment, the body 610 may be a housing used to protect the components of the system 600 and does not need to support the weight of any other items. For example, the system 600 can be used to deliver food to a house, a hotel room, and/or a table at a restaurant. For another example, the system 600 can be used as a security monitoring device configured to move around and monitor a given area.

While the foregoing is directed to embodiments of the disclosure, other and further embodiments of the disclosure thus may be devised without departing from the basic scope thereof, and the scope thereof is determined by the claims that follow.

The invention claimed is:

1. A smart luggage system, comprising:
a piece of luggage configured to store items for transport;
one or more proximity sensors coupled to the luggage and configured detect an object moving in a given direction while the luggage is in a side follow position next to the object; and
a central processing unit coupled to the luggage and configured to receive information from one or more of the proximity sensors to determine the given direction,
wherein the central processing unit is configured transition the luggage between a side following mode and a rear following mode, where when in the side following mode the luggage follows along a side of the object in the side follow position while moving in the given direction, and where when in the rear following mode the luggage follows along behind the object in a rear follow position while moving in the given direction,
wherein the central processing unit is configured to transition the luggage from the side follow position to the rear follow position based on information received from one or more of the proximity sensors, and
wherein the central processing unit is configured to transition the luggage from the rear follow position back to the side follow position after a predetermined amount of time, a predetermined amount of distance, or when instructed by the object moving in the given direction.

2. The system of claim 1, wherein the one or more proximity sensors include side proximity sensors coupled to a right or left side of the luggage.

3. The system of claim 1, further comprising one or more proximity sensors configured detect the object moving in the given direction while the luggage is in the rear follow position behind the object.

4. The system of claim 3, wherein the one or more proximity sensors include front proximity sensors coupled to a front side of the luggage such that the front proximity sensors are facing the object while the luggage is in the rear follow position behind the object.

5. The system of claim 1, wherein the object is a user, wherein the luggage includes a handle to allow the user to push, pull, or lift the luggage, and wherein the one or more proximity sensors include side proximity sensors coupled to a right or left side of the handle such that the side proximity sensors are facing the user while the luggage is in the side follow position next to the user.

6. The system of claim 5, wherein the handle further includes one or more front proximity sensors coupled to a front side of the handle and configured detect the object moving in the given direction while the luggage is in the rear follow position behind the object, wherein the front proximity sensors are facing the object while the luggage is in the rear follow position behind the object.

7. The system of claim 1, wherein the one or more proximity sensors comprises a camera coupled to the luggage.

8. The system of claim 1, further comprising a camera coupled to the luggage and configured to record visual images and detect the presence of nearby objects.

9. The system of claim 1, wherein the central processing unit is configured to maintain the luggage within a side distance of the object when in the side following mode based on information received from one or more of the proximity sensors, and wherein the side distance can be adjusted and set via a mobile phone, a wristband, or a gesture of the object moving in the given direction.

10. The system of claim 1, wherein the central processing unit is configured to speed up or slow down the luggage to maintain the object within a predetermined area based on information received from one or more of the proximity sensors.

11. The system of claim 1, wherein the central processing unit is configured to keep the luggage moving at a recorded speed of the object when another moving object at least partially or fully blocks the side proximity sensors from detecting the object.

12. The system of claim 1, further comprising three or more motorized wheel assemblies coupled to a bottom of the luggage and configured to move the luggage in the given direction, wherein the motorized wheel assemblies are configured to move the luggage along a diagonal direction while maintaining the luggage facing in a straight direction parallel to the given direction.

13. The system of claim 1, wherein the one or more proximity sensors comprise a single proximity sensor configured to detect the object moving in the given direction when the luggage is in the side follow position next to the object and the rear follow position behind the object.

14. A smart self-driving system, comprising:
a body;
one or more proximity sensors coupled to the body and configured detect an object moving in a given direction while the body is in a side follow position next to the object; and
a central processing unit coupled to the body and configured to receive information from one or more of the proximity sensors to determine the given direction,
wherein the central processing unit is configured transition the body between a side following mode and a rear following mode, where when in the side following mode the body follows along a side of the object in the side follow position while moving in the given direction, and where when in the rear following mode the body follows along behind the object in a rear follow position while moving in the given direction,
wherein the central processing unit is configured to transition the body from the side follow position to the rear follow position based on information received from one or more of the proximity sensors, and
wherein the central processing unit is configured to transition the body from the rear follow position back to the side follow position after a predetermined amount of time, a predetermined amount of distance, or when instructed by the object moving in the given direction.

15. The system of claim 14, wherein the one or more proximity sensors include side proximity sensors coupled to a right or left side of the body.

16. The system of claim 14, further comprising one or more proximity sensors configured detect the object moving in the given direction while the body is in the rear follow position behind the object, wherein the one or more proximity sensors include front proximity sensors coupled to a front side of the body such that the front proximity sensors are facing the object while the body is in the rear follow position behind the object.

17. The system of claim 14, wherein the object is a user, wherein the body includes a handle to allow the user to push, pull, or lift the body, wherein the one or more proximity sensors include side proximity sensors coupled to a right or left side of the handle such that the side proximity sensors are facing the user while the body is in the side follow position next to the user, and wherein the handle further includes one or more front proximity sensors coupled to a front side of the handle and configured detect the user moving in the given direction while the body is in the rear follow position behind the user, wherein the front proximity sensors are facing the user while the body is in the rear follow position behind the user.

18. The system of claim 14, wherein the one or more proximity sensors comprises a camera coupled to the body.

19. The system of claim 14, further comprising a camera coupled to the body and configured to record visual images and detect the presence of nearby objects.

20. The system of claim 14, wherein the central processing unit is configured to maintain the body within a side distance of the object when in the side following mode based on information received from one or more of the proximity sensors, and wherein the side distance can be adjusted and set via a mobile phone, a wristband, or a gesture of the object moving in the given direction.

21. The system of claim 14, wherein the central processing unit is configured to speed up or slow down the body to maintain the object within a predetermined area based on information received from one or more of the proximity sensors.

22. The system of claim 14, wherein the central processing unit is configured to keep the body moving at a recorded speed of the object when another moving object at least partially or fully blocks the side proximity sensors from detecting the object.

23. The system of claim 14, further comprising three or more motorized wheel assemblies coupled to a bottom of the body and configured to move the body in the given direction, wherein the motorized wheel assemblies are configured to move the body along a diagonal direction while maintaining the body facing in a straight direction parallel to the given direction.

24. The system of claim 14, wherein the one or more proximity sensors comprise a single proximity sensor configured to detect the object moving in the given direction when the body is in the side follow position next to the object and the rear follow position behind the object.

25. A smart self-driving system, comprising:
a body;
one or more proximity sensors coupled to the body and configured detect an object moving in a given direction while the body is in a side follow position next to the object; and
a central processing unit coupled to the body and configured to receive information from one or more of the proximity sensors to determine the given direction and to determine a predetermined area having a front boundary and a rear boundary within which the object moves,
wherein the central processing unit is configured to maintain the object within the predetermined area while moving the body in the given direction and recording a speed at which the object moves based on information from one or more of the proximity sensors, and
wherein when a third object moves between the object and the body either from the front boundary or the rear boundary and at least partially or fully blocks the one or more proximity sensors from detecting the object, the central processing unit is configured to store the recorded speed of the object and keep the body moving at the recorded speed instead of a speed of the third object until the one or more proximity sensors are able to detect the object moving at the recorded speed again.

26. The system of claim 25, wherein the body is a piece of luggage configured to store items for transport.

27. The system of claim 25, further comprising three or more motorized wheel assemblies coupled to a bottom of the body and configured to move the body in the given direction.

28. The system of claim 25, wherein the central processing unit is configured to maintain the body within a side distance of the object based on information received from one or more of the proximity sensors, and wherein the side distance can be adjusted and set via a mobile phone, a wristband, or a gesture of the object moving in the given direction.

29. The system of claim 25, wherein the central processing unit is configured to speed up or slow down the body to maintain the object within the predetermined area based on information received from one or more of the proximity sensors.

30. The system of claim 25, wherein the central processing unit is configured to transition the body from the side follow position to a rear follow position based on information received from one or more of the proximity sensors, and wherein the central processing unit is configured to transition the body from the rear follow position back to the side follow position after a predetermined amount of time, a predetermined amount of distance, or when instructed by the object moving in the given direction.

* * * * *